United States Patent
Ramakrishnan et al.

(10) Patent No.: US 10,853,811 B2
(45) Date of Patent: Dec. 1, 2020

(54) RISK DETERMINATION ENABLED CRYPTO CURRENCY TRANSACTION SYSTEM

(71) Applicant: PAYPAL, INC., San Jose, CA (US)

(72) Inventors: Sriram Ramakrishnan, Austin, TX (US); Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 264 days.

(21) Appl. No.: 15/858,773

(22) Filed: Dec. 29, 2017

(65) Prior Publication Data
US 2019/0205886 A1 Jul. 4, 2019

(51) Int. Cl.
G06Q 20/40 (2012.01)
G06Q 20/06 (2012.01)
G06Q 20/38 (2012.01)
G06Q 20/10 (2012.01)

(52) U.S. Cl.
CPC ....... *G06Q 20/4016* (2013.01); *G06Q 20/065* (2013.01); *G06Q 20/10* (2013.01); *G06Q 20/3829* (2013.01); *G06Q 2220/00* (2013.01)

(58) Field of Classification Search
CPC ............. G06Q 20/4016; G06Q 20/065; G06Q 20/3829; G06Q 2220/00; G06Q 20/10
See application file for complete search history.

(56) References Cited

U.S. PATENT DOCUMENTS

2016/0292672 A1* 10/2016 Fay .................... G06Q 20/363
2019/0172067 A1* 6/2019 Arora ................ G06Q 20/4016

* cited by examiner

*Primary Examiner* — Calvin L Hewitt, II
*Assistant Examiner* — Vincent Idiake
(74) *Attorney, Agent, or Firm* — Haynes and Boone, LLP

(57) ABSTRACT

Systems and methods for providing risk determination in a crypto currency transaction include receiving, through a network via a broadcast by a first payer device, a first crypto currency transaction that includes a first payee public address. A first request for a determination of risk associated with the first crypto currency transaction is then identified in the first crypto currency transaction, with the first request including risk criteria. A first payee involved in the first crypto currency transaction is then identified using the first payee public address, and first payee risk information is accessed via at least one external risk information database based on the identification of the first payee. If it is determined that the first payee risk information satisfies the at least one risk criteria in the first request, the first crypto currency transaction is provided for addition to a block in a crypto currency public ledger.

20 Claims, 9 Drawing Sheets

RISK DETERMINATION ENABLED CRYPTO CURRENCY TRANSACTION SYSTEM

BACKGROUND

The present disclosure generally relates to online and/or mobile payments, and more particularly to performing a determination of risk as part of a crypto currency transaction.

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Conventional payment service providers typically provide for payment by a payer to a payee through the use of payer accounts of the payer (e.g., credit accounts, banking account, and/or a variety of other payer accounts that may be provided by an account provider). For example, the payment service provider may provide a payment service account to the payer, and the payer may link one or more payer accounts to the payment service account (or the payment service account may include a payer account provided by the payment service provider). In a transaction between the payer and the payee, the payment service provider may then transfer funds from one of the payer accounts to a payee account of the payee (which may also be provided by the account providers or payment service provider). The use of such payer accounts, payee accounts, and payment service accounts is controlled by one or more account providers that operate to ensure that funds in the payer accounts or payee accounts are not misappropriated, and to mediate disputes associated with the transfer of funds between payer accounts and payee accounts.

An alternative to payer accounts and payee accounts provided by an account provider is the use of distributed crypto currencies such as, for example, Bitcoin, Ethereum, Litecoin, Monero, and/or a variety of other distributed crypto currencies known in the art. Distributed crypto currencies are not controlled by any central authority, but rather by a distributed network of computing devices that operate to confirm transfers of the crypto currency between payers and payees. Such decentralized distributed crypto currencies provide for the transfer of the crypto currency between users in the system, but offer no mechanism for identifying or determining risks associated with participating in a crypto currency transaction with another party. As such, a party to a crypto currency transaction is unable to ensure that they only transact with other parties that satisfy risk criteria, and instead are forced to transact "blindly" with parties that may be unknown or have unknown histories.

Thus, Applicant recognizes that there is a need for a risk determination enabled crypto currency transaction system.

Figure 1:
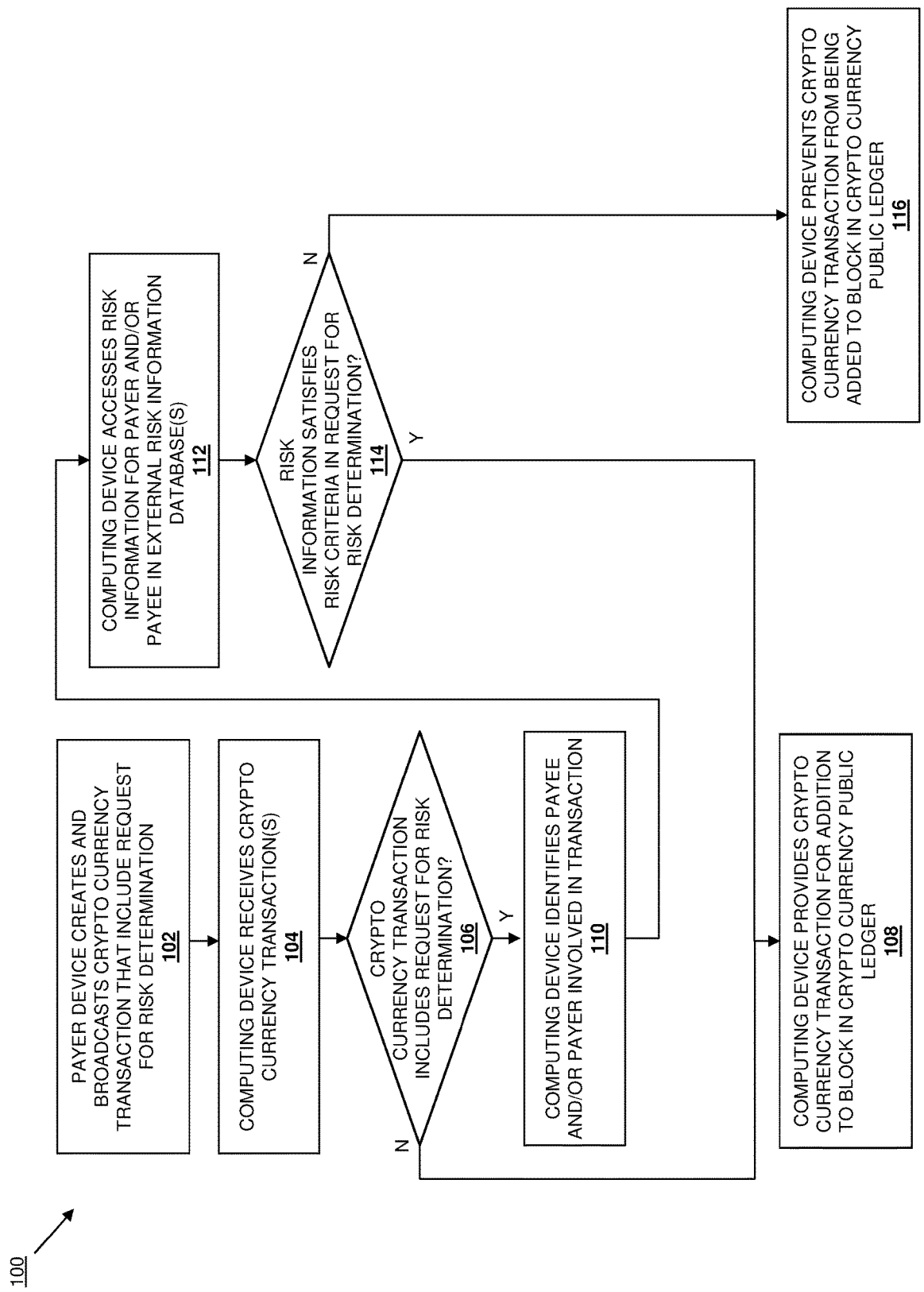
FIG. 1 is a flow chart illustrating an embodiment of a method for providing a risk determination enabled crypto currency transaction.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure describe systems and methods for enabling risk determinations in a crypto currency transaction. A payer creating the crypto currency transaction may choose to enable risk determinations by using a wallet application to create a crypto currency transaction that includes a request for a risk determination that designates risk criteria. As discussed below, a payer may designate the risk criteria in the crypto currency transaction in order to have a risk determination made about a payee involved in the crypto currency transaction, and/or may designate the risk criteria as required by the payee in order to have a risk determination made about the payer before the crypto currency transaction will be allowed to proceed. The payer may then broadcast the crypto currency transaction via a network, and computing device(s) that are part of a distributed network that maintain a crypto currency public ledger may receive that crypto currency transaction. In response to verifying the crypto currency transaction is valid and identifying that the crypto currency transaction includes the request to make the risk determination, the computing device(s) may add it to a risk determination memory pool. A computing device may then retrieve the transaction from the risk determination memory pool, and may identify the payee using a payee public address included in the transaction. The computing device may then access an external risk information database in order to identify risk information about the payee, and make a determination of whether that risk information satisfies the risk criteria in the request. If the risk information satisfies the risk criteria, the computing device then provides the crypto currency transaction for addition to a transaction memory pool, where computing devices that are part of the distributed network may attempt to add it to a block in the crypto currency public ledger. If the computing device determines that the risk information does not satisfy the risk criteria in the request, the crypto currency transaction is not provided for addition to the transaction memory pool such that computing devices that are part of the distributed network are prevented from adding it to a block in the crypto currency public ledger.

Figure 2:
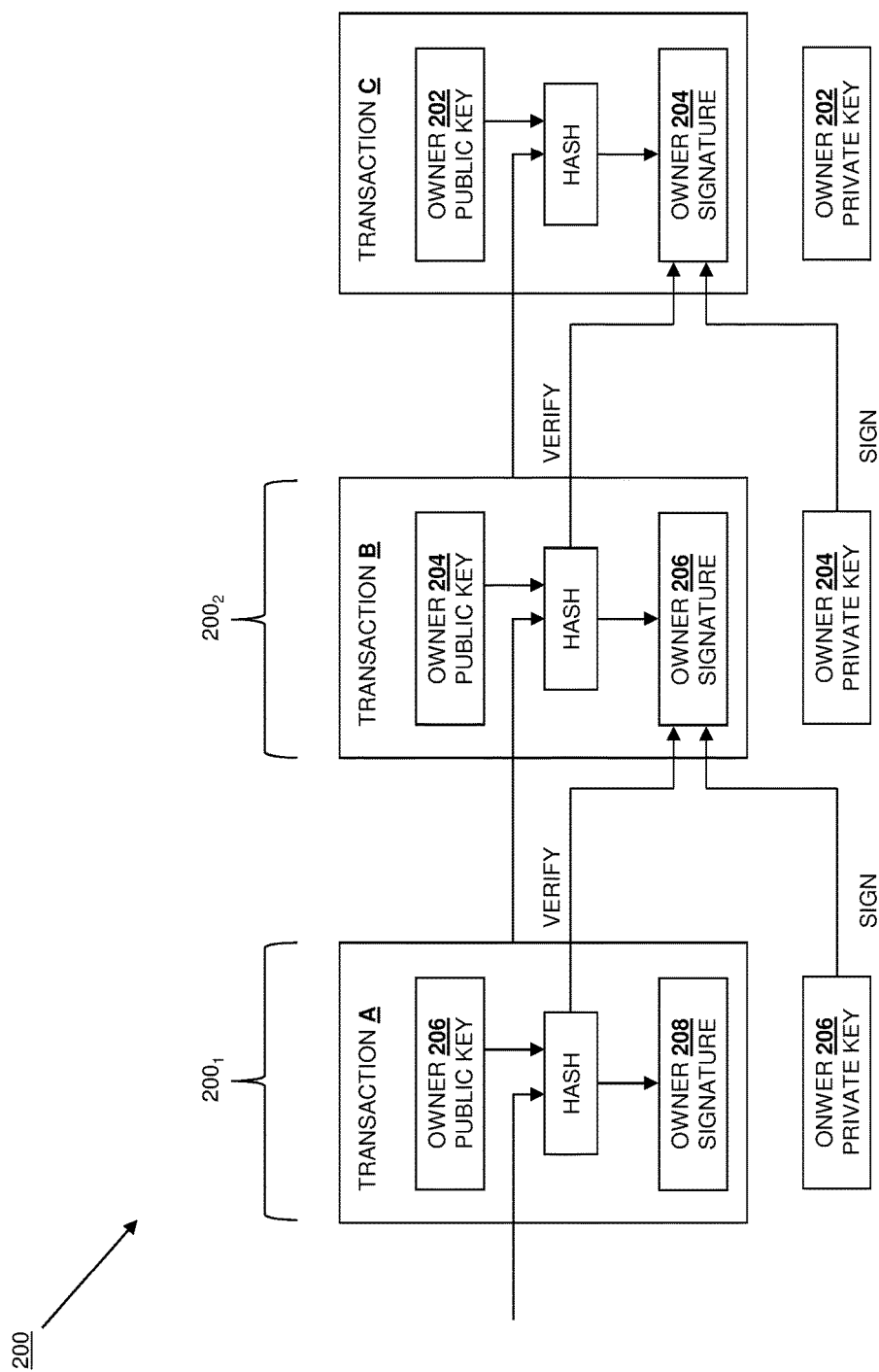
FIG. 2 is a schematic view illustrating an embodiment of an electronic coin.
Figure 3:
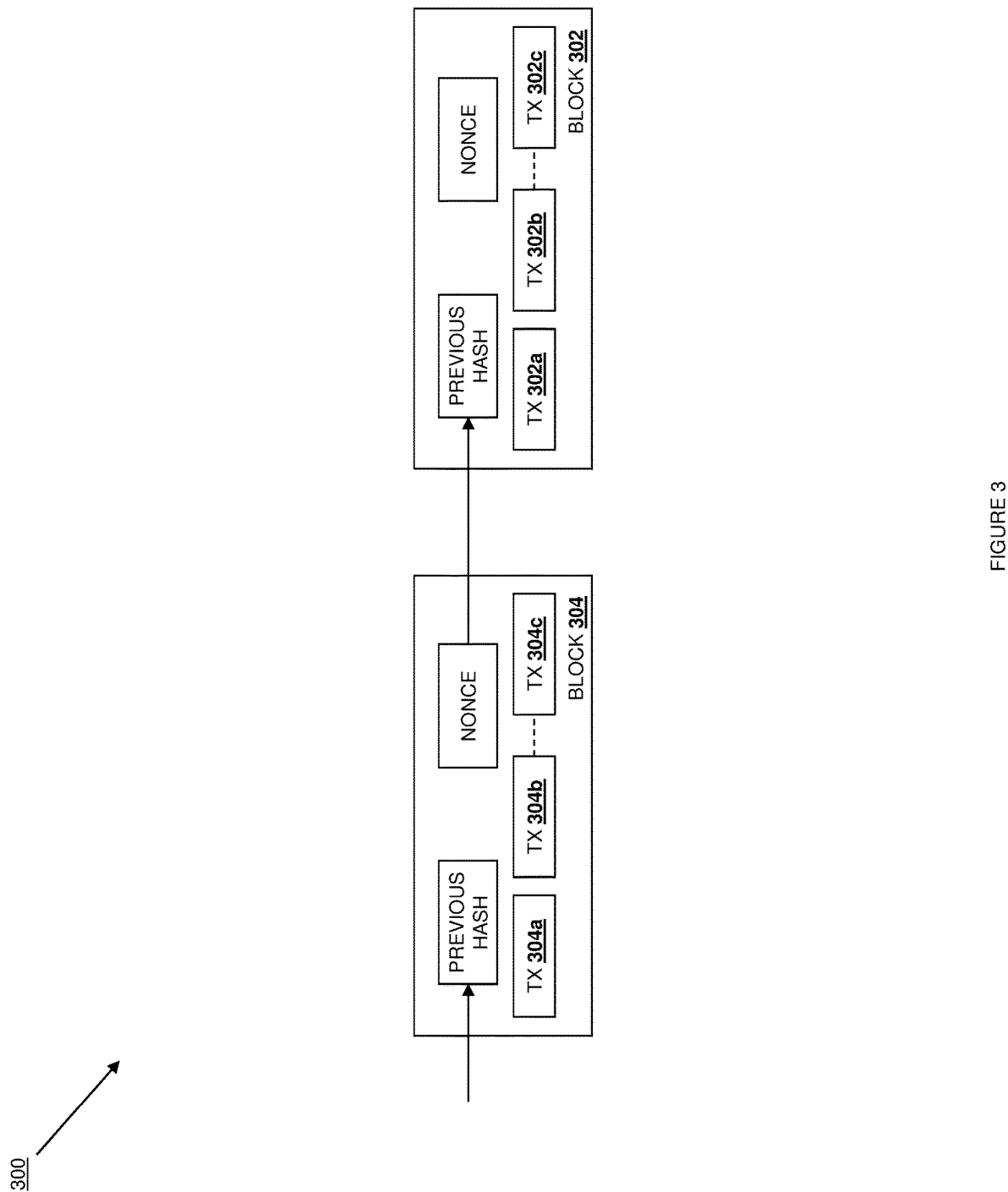
FIG. 3 is a schematic view illustrating an embodiment of a crypto currency public ledger.

Referring now to FIGS. 1, 2, and 3, a method 100 for providing a risk determination in a crypto currency transaction is illustrated. In some embodiments of the method 100 described below, one or more system provider devices may operate to perform at least a portion the method 100. For example, a distributed group of one or more computing devices may operate to generate (a.k.a. "mine") a crypto currency while creating blocks in a blockchain (also referred to below as a crypto currency public ledger), and maintain that blockchain while performing the method 100 as detailed below. In another embodiment, one or more system provider devices may perform the method 100 to provide crypto currency transaction risk determinations separate from the generation of the crypto currency to create blocks in the blockchain, and the maintenance of that blockchain. For example, a payment service provider such as, for example, PayPal, Inc. of San Jose, Calif., may utilize payment service provider device(s) to perform at least some of the method 100 (e.g., the crypto currency transaction risk determinations) discussed below, and in some embodiments may operate in cooperation with one or more other system providers (via their system provider devices), payers (via their payer devices) and/or payees (via their payee devices) to perform at least the crypto currency transaction risk determination portions of the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Referring now to FIG. 2, an embodiment of an electronic coin 200 is illustrated and described briefly for reference to the method 100 discussed below. The crypto currency system associated with the present disclosure defines an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) and added to an initial electronic coin (which was defined by digital signatures provided up to the transaction prior to transaction A) such that the electronic coin $200_1$ was transferred to owner 206. Similarly, in transaction B, a hash of the public key of owner 204 (i.e., the owner receiving, as a result of transaction B, an electronic coin 2002 defined by digital signatures provided up to transaction B) and transaction A was signed by owner 206 and added to the electronic coin $200_1$ such that the electronic coin $200_2$ was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins" is used to encompass any amount of electronic coins, from fractions of a coin (e.g., 0.00564500 electronic coins) to many multiples of coins (e.g., 56,000.00000000 electronic coins).

Referring now to FIG. 3, an embodiment of a crypto currency public ledger 300 is illustrated and described briefly for reference to the method 100 discussed below. The crypto currency public ledger 300 operates to verify that payers transferring an electronic coin (e.g., referring back to FIG. 2, owner 206 in transaction A, owner 204 in transaction B, and owner 202 in transaction C) did not "double-spend" (e.g., sign any previous transactions involving) that electronic coin. To produce the crypto currency public ledger 300, a distributed network of computing devices operate to agree on a single history of crypto currency transactions in the order in which they were received such that it may be determined that a crypto currency transaction between a payer and a payee using an electronic coin is the first crypto currency transaction associated with that electronic coin. Each device in the distributed network operates to collect new crypto currency transactions into a block, and then to increment a proof-of work system that includes determining a value that when hashed with the block provides a required number of zero bits. For example, for a block 302 that includes a plurality of transactions 302a, 302b, and up to 302c, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the crypto currency transactions in it are valid and not already spent (which may be determined by creating the next block using the hash of the accepted block 302). The distributed network will always consider the longest chain blocks to be the correct one, and will operate to continue to extend it. If a computing device receives two different versions of a block, it will work on the first block received, but save the second block received in case the branch of the chain that includes the second block becomes longer (at which point that device with switch to working on the branch of the chain that includes the second block).

Figure 4:
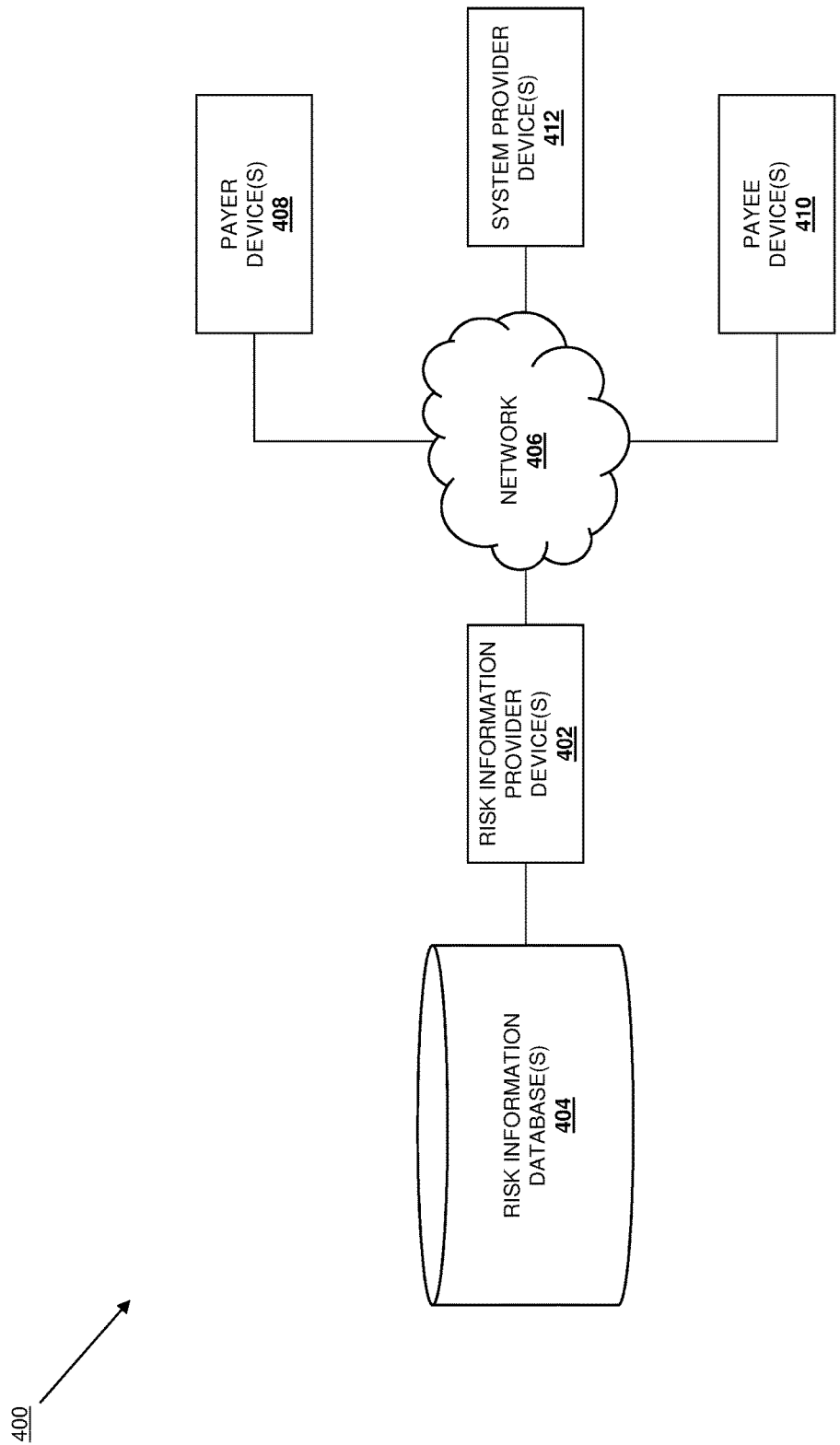
FIG. 4 is a schematic view illustrating an embodiment of a risk determination enabled crypto currency transaction system.

Referring now to FIG. 4, an embodiment of a risk determination enabled crypto currency system 400 is illustrated. In the illustrated embodiment, one or more risk information provider devices 402 are coupled to one or more risk information databases 404 and to a network 406 such as, for example, the Internet. In some embodiments, at least one of the risk information provider devices 402 may be operated by a payment service provider such as, for example, PAYPAL® Inc. of San Jose, Calif., United States. In such embodiments, the risk information database(s) 404 may include risk information about payers and payees collected by the payment service provider during the course of providing payment services. However, the risk information provider device(s) 402 may be operated by a variety of risk information providers that generate, collect, and/or otherwise compile risk information (e.g., credit agencies, insurance agencies, etc.), and the risk information database(s) 404 may store a variety of types of risk data about payers and payees, while remaining within the scope of the present disclosure.

In specific embodiments, the risk information stored in the risk information database(s) 404 may include crypto-currency-blockchain-specific risk information such as, for example, whether a crypto currency public address has ever been used to receive and/or receive electronic coins, how long the crypto currency public address has held electronic coins and/or its history of holding electronic coins, whether the payment service provider has certified the crypto currency public address as legitimate, etc. Furthermore, the risk information stored in the risk information database(s) 404 may include non-crypto-currency-blockchain-specific risk information such as whether a party to the crypto currency transaction can be identified by a valid Internet Protocol (IP) address, whether a party to the transaction is associated with an approved country or location, whether a party to the transaction has performed crypto currency transactions using the system before, whether the party to the crypto currency transactions has had previous crypto currency transactions disputed or reported, etc. While some examples have been provided, one of skill in the art in possession of the present disclosure will recognize that any risk information about payers and payees may be stored in the risk information database(s) 404 while remaining within the scope of the present disclosure.

In the illustrated embodiment, one or more payer devices 408 are coupled to the network 206, and any of those payer device(s) 408 may be operated by payer(s) involved in the crypto currency transactions discussed below. Similarly, one or more payee devices 410 are coupled to the network 206, and any of those payee device(s) 410 may be operated by payee(s) involved in the crypto currency transactions discussed below. Furthermore, one or more system provider device(s) 412 are coupled to the network 206, and those system provider device(s) 412 may be part of the distributed network of computing devices that operate to maintain the crypto currency public ledger 300 discussed above. Further still, while illustrated in FIG. 4 and discussed in some embodiments below as operating separately to perform separate functions, in some embodiments, the functionality of a the risk information provider device(s) 402 and the system provider device(s) 412 may be combined such that computing devices in the distributed network of computing devices that operate to maintain the crypto currency public ledger 300 also operate to perform the risk determinations by accessing the risk information database(s) as discussed below. Thus, while a specific embodiment has been illustrated, one of skill in the art in possession of the present disclosure will appreciate that risk determination enabled crypto currency system 400 illustrated in FIG. 4 may include a variety of modification while remaining within the scope of the present disclosure.

Figure 5:
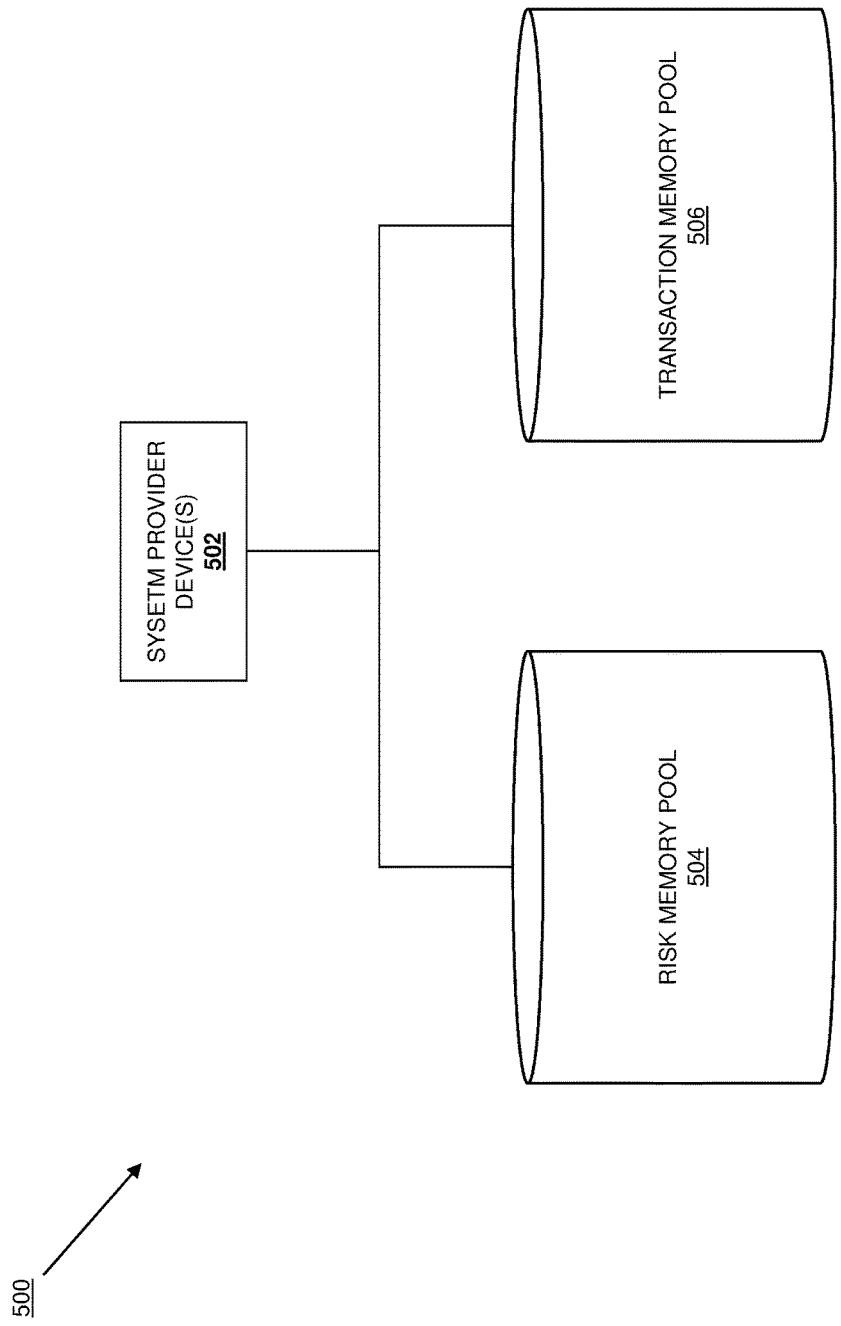
FIG. 5 is a schematic view illustrating an embodiment of a memory pool subsystem that may be used in the risk determination enabled crypto currency transaction system of FIG. 3.

Referring now to FIG. 5, an embodiment of memory pool subsystem 500 is illustrated. As would be understood by one of skill in the art in possession of the present disclosure, when a crypto currency transaction is broadcast through the network to a distributed network of computing devices that maintain the crypto currency public ledger, that unconfirmed crypto currency transaction is added to a memory pool on each of those computing devices, and then crypto currency transactions are retrieved by the computing devices from their memory pool, verified (i.e., the owner's signature utilizing the owner's private key is confirmed as valid for spending the crypto currency from the identified public address), and grouped in an attempt to add them as part of a block in the crypto currency public ledger (as discussed above.)

In some embodiments of the present disclosure, the memory pool subsystem 500 may be implemented in which each system provider device 502 (which are substantially similar to the system provider device(s) 412 discussed above) includes a risk memory pool 504 and a transaction memory pool 506. As discussed in further detail below, crypto currency transactions that include a request for a risk determination may be initially be added to the risk memory pool, then retrieved from the risk memory pool 504 for risk determination and, if those crypto currency transactions satisfy risk criteria, added to the transaction memory pool 506. However, if those crypto currency transactions do not satisfy risk criteria, they may be dropped such that they are not added the transaction memory pool 506. The system provider device(s) 502 may then process crypto currency transactions in the transaction memory pool 506 in substantially the same manner as discussed above. However, in other embodiments, conventional crypto currency transactions and crypto currency transactions that include requests for risk determinations may be added to a common memory pool and processed as discussed below while remaining within the scope of the present disclosure.

The method 100 begins at block 102 where a payer device creates and broadcasts a crypto currency transaction that includes a request for a risk determination. In an embodiment, at block 102 a payer and payee may be involved in a transaction where the payer is to pay the payee for products and/or services. In the embodiments discussed below, the payee accepts crypto currency, and the payer would like to pay for the transaction with crypto currency. In a specific example, a payment service provider such as, for example, PAYPAL® Inc. of San Jose, Calif., United States, provides a wallet application on the payer device that allows the payer to pay for transaction using crypto currency, and also allows the determination of a risk associated with a crypto currency transaction. For example, a payer involved in a transaction with a payee may open a wallet application on their payment device, and select an option to use a crypto currency to perform that transaction. In some embodiments, the wallet application may provide the payer the option to request that a risk determination be performed with the crypto currency transaction (i.e., in selecting an option on a wallet GUI to use a crypto currency to perform the transaction, the user may also select an option on the wallet GUI to have a risk determination be performed with the crypto currency transaction.) In other embodiments, the selection of the option to use a crypto currency to perform the transaction may include, by default, the request to perform the risk determination with the crypto currency transaction.

In some embodiments, the payer may use a payer device 408 to create the crypto currency transaction that includes the request to perform the risk determination on the payee involved in the transaction. As such, a payer who only desires to perform crypto currency transactions with payees that satisfy particular risk criteria may create their crypto currency transactions that include conventional crypto currency transaction information (e.g., a public address controlled by the payee, a transaction amount, etc.) along with a request to perform a risk determination about the payee. In some embodiments, the payer may use a payer device 408 to create, at the request of the payee, the crypto currency transaction that includes the request to perform the risk determination on the payer involved in the transaction. As such, a payee who only desires to perform crypto currency transactions with payers that satisfy particular risk criteria may require payers to create their crypto currency transactions that include conventional crypto currency transaction information (e.g., a public address controlled by the payee, a transaction amount, etc.) along with a request to perform a risk determination on the payer involved in the transaction. Furthermore, payers may use their payer device 408 to create crypto currency transactions that include requests to perform the risk determination on both the payer and the payee involved in the transaction.

In different embodiments, the request to perform the risk determination with the crypto currency transaction may identify a variety of risk criteria that should be checked for the payer and/or the payee. For example, risk criteria for performing a risk determination may include crypto-currency-blockchain-specific risk criteria such as, for example, whether a crypto currency public address has ever been used to receive and/or receive electronic coins, how long the crypto currency public address has held electronic coins and/or its history of holding electronic coins, whether the payment service provider has certified the crypto currency public address as legitimate, etc. Furthermore, the risk criteria for performing a risk determination may include non-crypto-currency-blockchain-specific risk criteria such as whether a party to the crypto currency transaction can be identified by a valid Internet Protocol (IP) address, whether a party to the transaction is associated with an approved country or location, whether a party to the transaction has performed crypto currency transactions using the system before, whether the party to the crypto currency transactions has had previous crypto currency transactions disputed or reported, etc., and/or a variety of other risk criteria that would be apparent to one of skill in the art in possession of the present disclosure. While some specific examples of risk criteria have been provided, one of skill in the art in possession of the present disclosure will recognize that any risk criteria may be identified in a crypto currency transaction while remaining within the scope of the present disclosure.

In some examples, the risk criteria may be included in the crypto currency transaction in their entirety (e.g., the crypto currency transaction may include metadata that details each risk criteria that should be checked for the payer and/or the payee (e.g., "ensure payee is located in an approved country"). However, in other embodiments, the risk criteria included in the crypto currency transaction may be provided as reference pointers that may be used by system provider devices 412 to access a risk criteria reference, which operates to reduce the size of crypto currency transactions that includes requests to perform risk determinations (e.g., a reference pointer of "1" may be identified in a risk criteria reference as "ensure party is located in an approved country", thus allowing the identification of the risk criteria in the crypto currency transaction to be performed using a single digit). While a few examples of providing requests to perform risk determinations and/or risk criteria in a crypto currency transaction have been provided, one of skill in the art in possession of the present disclosure will recognize that the risk determination requests of the present disclosure may be provided in crypto currency transactions in a wide variety of manners while remaining within the scope of the present disclosure.

Following the creation of the crypto currency transaction, the wallet application on the payer device 408 may operate to broadcast that crypto currency transaction through the network to the system provider devices 412. As such, different payer devices 408 may create respective crypto currency transactions and broadcast those transactions through the network to the system provider devices 412. While block 102 of the method 100 describes those crypto currency transactions as including requests to perform risk determinations, one of skill in the art in possession of the present disclosure will recognize that, in some embodiments, payer devices 408 may also create conventional crypto currency transactions and broadcast them through the network to the system provider devices 412 as well.

The method 100 then proceeds to block 104 where a computing device receives crypto currency transactions. In an embodiment, at block 104, the system provider devices 412 may receive crypto currency transactions. As discussed above, the system provider devices 412 may be a part of a distributed network of computing devices that operate to maintain the crypto currency public ledger that tracks the exchange of electronic coins via the transactions broadcast through the network. As such, at block 104, any number of system provider devices 412 may receive conventional crypto currency transactions, as well as crypto currency transactions that include the request to perform the risk determinations of the present disclosure. In some embodiments, system provider devices 412 receiving crypto currency transactions at block 104 may store those crypto currency transactions in a memory pool prior to adding them to a block. However, as discussed above, in embodiments that utilize the memory pool subsystem 500 of FIG. 5, system provider devices 412 may receive crypto currency transactions that include requests for risk determinations at block 104 and store those crypto currency transactions in the risk memory pool 504, and may receive conventional crypto currency transactions at block 104 and store those conventional crypto currency transactions in the transaction memory pool 506.

The method 100 then proceeds to decision block 106 where the computing device determines whether a crypto currency transaction includes a request for a risk determination. In an embodiment, at decision block 106, a system provider device 412 may access a memory pool and retrieve a crypto currency transaction. As discussed above, in embodiments in which conventional crypto currency transactions and crypto currency transaction including requests for risk determinations are stored in a common memory pool, the system provider device 412 may access that common memory pool and retrieve either a conventional crypto currency transaction or a crypto currency transaction including a request for risk determination. Thus, at decision block 106, the system provider device 412 may operate to analyze the metadata included in the crypto currency transaction that was retrieved in order to determine whether that crypto currency transaction includes the request to perform the risk determination. For example, the request to perform the risk determination may include a risk determination bit that is set in metadata of the crypto currency transaction, while conventional crypto currency transactions will not have the risk determination bit set, and the system provider device 412 may detect whether the risk determination bit is set to determine if the crypto currency transaction includes a request to perform a risk determination.

In embodiments that utilize the memory pool subsystem 500 of FIG. 5, the system provider device 412 may access the transaction memory pool 506 and retrieve a conventional crypto currency transaction, or access the risk memory pool 504 and retrieve a crypto currency transaction that includes a request to perform a risk determination. As such, the determination at decision block 106 of whether the crypto currency transaction includes a request for a risk determination may be performed in response to performing a determination of whether to access the risk memory pool 504 (which includes crypto currency transactions with requests for risk determinations) or to access the transaction memory pool 506 (which includes conventional crypto currency transactions.)

If, at decision block 106, the computing device determines that the crypto currency transaction does not include a request for a risk determination, the method 100 proceeds to block 108 where the computing device provides the crypto currency transaction for addition to a block in a crypto currency public ledger. In an embodiment, a system provider device 412 that retrieves a conventional crypto currency transaction from a common memory pool or the transaction memory pool 506 may determine that that crypto currency transaction does not include a request for a risk determination, and at block 108 will provide the crypto currency transaction for addition to a block in the crypto currency public ledger by grouping that crypto currency transaction with other crypto currency transactions, and then incrementing a proof-of work system that includes determining a value that when hashed with those crypto currency transactions provides a required number of zero bits, thus creating the block that is added to the crypto currency public ledger.

If, at decision block 106, the computing device determines that the crypto currency transaction includes a request for a risk determination, the method 100 proceeds to block 110 where the computing device identifies a payee and/or a payer involved in the crypto currency transaction. In an embodiment, at decision block 106, a system provider device 412 may access a memory pool and retrieve a crypto currency transaction. As discussed above, in embodiments in which conventional crypto currency transactions and crypto currency transaction including requests for risk determinations are stored in a common memory pool, the system provider device 412 may access that common memory pool and retrieve a crypto currency transaction, and then analyze the metadata included in the crypto currency transaction in order to determine whether that crypto currency transaction includes the request to perform the risk determination (e.g., by detecting whether the risk determination bit is set). In embodiments that utilize the memory pool subsystem 500 of FIG. 5, the system provider device may access the risk memory pool 504 and retrieve a crypto currency transaction that includes a request to perform a risk determination. As such, the determination at decision block 106 of whether the crypto currency transaction includes a request for a risk determination may be performed in response to a determination to access the risk memory pool 504 (which includes crypto currency transactions with request for risk determinations)

If, at decision block 106, the computing device determines that the crypto currency transaction includes a request for a risk determination, the method 100 proceeds to block 110 where the computing device identifies a payer and/or a payee involved in the transaction. In an embodiment, a system provider device 412 that retrieves a crypto currency transaction having a request for risk determination from a common memory pool or from the risk memory pool 504 may determine that that crypto currency transaction includes a request for a risk determination, and at block 110 will analyze that transaction to determine whether the risk determination is requested for the payer involved in the crypto currency transaction, the payee involved in the crypto currency transaction, or both the payer and the payee involved in the crypto currency transaction.

In some embodiments, payees (e.g., merchants) may register the public addresses they use to receive crypto currency transactions with risk information providers. For example, payees may participate in the risk determination enabled crypto currency transaction system 400 by providing, through the network 406 to the risk information provider device(s) 402 via their payee devices 410, any public address that they will provide to payers to receive crypto currency from those payers in crypto currency transactions that request risk determinations. The risk information provider device(s) 402 may then store those public addresses in association with identifiers for those payees in a registered public address database that is included with or similar to the risk information database(s) 404. As such, in some embodiments, at block 110 and in response to determining that a risk determination for the payee in the crypto currency transaction has been requested, the system provider device 412 may identify the public address controlled by the payee that is included in the crypto currency transaction in order to identify the payee involved in the crypto currency transaction. As discussed in further detail below, while the identification of the public address controlled by the payee does not actually provide conclusive proof of the payees identity at this point in the method 100, the linking of the payees identity to that public address in the registered public address database/risk information database(s) 404 will allow for such identification as the method 100 continues.

Similarly, in some embodiments, payers (e.g., customers) may register the public addresses they use to send crypto currency transactions with risk information providers. For example, payers may participate in the risk determination enabled crypto currency transaction system 400 by providing, through the network 406 to the risk information provider device(s) 402 via their payer devices 408, any public address that they will use to send crypto currency to payees in crypto currency transactions that request risk determinations. The risk information provider device(s) 402 may then store those public addresses in the registered public address database/risk information database(s) 404 in association with identifiers for those payers. As such, in some embodiments, at block 110 and in response to determining that a risk determination for the payer in the crypto currency transaction has been requested, the system provider device 412 may identify the public address that is controlled by the payer and that is being used to send crypto currency in the crypto currency transaction in order to identify the payer involved in the crypto currency transaction. As discussed in further detail below, while the identification of the public address controlled by the payer does not actually provide conclusive proof of the payers identity at this point in the method 100, the linking of the payers identity to that public address in the registered public address database/risk information database(s) 404 will allow for such identification as the method 100 continues.

The method 100 then proceeds to block 112 where the computing device accesses risk information for the payer and/or the payee in external risk information database(s). In an embodiment, at block 112, the system provider device 412 may provide, to the risk information provider device(s) 402, the public address controlled by the payee that was identified in the crypto currency transaction, along with a request for risk information that corresponds to the risk criteria that was included in the request for the risk determination for the crypto currency transaction. For example, the system provider device 412 may review the request for the risk determination in the crypto currency transaction in order to identify the risk criteria that has been requested to be determined for the payee involved in the crypto currency transaction. As such, the system provider device 412 may identify the risk criteria (or reference pointers for the risk criteria, discussed above) in metadata included in the crypto currency transaction, and determine which risk information provider device(s) 402 control access to risk information (i.e., in their risk information database(s) 404) that allows for the determination of that risk criteria.) The system provider device 412 then provides the public address controlled by the payee along with that risk criteria to the determined risk information provider device(s) 402.

Similarly, in an embodiment, at block 112, the system provider device 412 may provide, to the risk information provider device(s) 402, the public address controlled by the payer that was identified in the crypto currency transaction, along with a request for risk information that corresponds to the risk criteria that was included in the request for the risk determination for the crypto currency transaction. For example, the system provider device 412 may review the request for the risk determination in the crypto currency transaction in order to identify the risk criteria that has been requested to be determined for the payer involved in the crypto currency transaction. As such, the system provider device 412 may identify the risk criteria (or reference pointers for the risk criteria, discussed above) in metadata included in the crypto currency transaction, and determine which risk information provider device(s) 402 control access to risk information (i.e., in their risk information database(s) 404) that allows for the determination of that risk criteria. The system provider device 412 then provides the public address controlled by the payer along with that risk criteria to the determined risk information provider devices 402.

At block 112, risk information provider device(s) 402 that received the identity of the payers and/or payees along with requests for risk information (via identified risk criteria) then access their risk information database(s) and use the identities of the payers and/or payees to retrieve risk information about those payers and/or payees. For example, upon receiving the identification of a public address controlled by the payee along with identified risk criteria, a risk information provider device 402 may use the identification of the public address controlled by the payee to access risk information stored in the risk information database(s) 404 about that payee (which is linked in those databases to the public address controlled by that payee as discussed above). Then, using the risk criteria identified by the system provider device, the risk information provider device 102 may retrieve any risk information stored for that payee that corresponds to those identified risk criteria, and send it through the network to the system provider device 412. As discussed above, risk criteria may be identified via reference pointers, and at block 112, the risk information provider device 402 may access a risk criteria reference using those reference pointers to identify the risk criteria used to retrieve the risk information for the payee.

Similarly, upon receiving the identification of a public address controlled by the payer along with identified risk criteria, a risk information provider device 402 may use the identification of the public address controlled by the payer to access risk information stored in the risk information database(s) 404 about that payer (which is linked in those databases to the public address controlled by that payer as discussed above). Then, using the risk criteria identified by the system provider device 412, the risk information provider device 402 may retrieve risk information for that payer that corresponds to that identified risk criteria, and send it through the network to the system provider device 412. As discussed above, risk criteria may be identified via reference pointers, and at block 112, the risk information provider device 402 may access a risk criteria reference using those reference pointers to identify the risk criteria used to retrieve the risk information for the payer.

As such, at block 112, the system provider device(s) 412 may retrieve risk information about the payer and/or the payee based on the request for the risk determination that is included in the crypto currency transactions. While the discussions above focus on system provider devices 412 that are separate from the risk information provider devices 402, in some embodiments, risk information provision and system provider functionality may be combined into single devices or entities, which allows the system provider device/risk information provider device to retrieve the risk information from the risk information database(s) itself in response to identifying the payer and/or payee and the risk criteria to be considered for the crypto currency transaction. As such, one of skill in the art in possession of the present disclosure will recognize that the accessing of the risk information may be performed in a variety of manners other than those that have been explicitly described while remaining within the scope of the present disclosure.

The method 100 then proceeds to decision block 114 where the computing device determines whether the risk information satisfies risk criteria in the request for the risk determination. In an embodiment, at decision block 114, the system provider device 412 determines whether the risk information received for the payer and/or the payee at block 112 satisfies the risk criteria identified in the request for the risk determination for the crypto currency transaction. Thus, at decision block 114, the system provider device 412 may compare the risk information received for the payee to the risk criteria included in the request for the risk determination about the payee involved in the crypto currency transaction. Similarly, at decision block 114, the system provider device 412 may compare the risk information received for the payer to the risk criteria included in the request for the risk determination about the payer involved in the crypto currency transaction In specific examples, and in addition to the risk information/risk criteria discussed above, the determination of whether the risk information satisfies the risk criteria included in the risk determination about the payee in the crypto currency transaction may include whether payee has transacted on the crypto currency public ledger before and, if not, how long has the payee public address held electronic coins on the crypto currency public ledger; whether the payee has transacted previously with the payer, a number of disputed transaction associated with the payee, etc. Any of these determinations may result in an assignment or adjustment of a risk score that may be compared to a risk threshold that determines whether the risk information satisfies the risk criteria included in the risk determination about the payee in the crypto currency transaction. While a few specific examples have been provided, one of skill in the art in possession of the present disclosure will appreciate that any type of risk information about a payee may be retrieved compared to any type of risk criteria to determine whether it satisfies that risk criteria while remaining within the scope of the present disclosure.

In a specific examples, and in addition to the risk information/risk criteria discussed above, the determination of whether the risk information satisfies the risk criteria included in the risk determination about the payer in the crypto currency transaction may include whether the payer is a verified person or an approved entity based on prior transactions received at the payer public address, whether the payer public address has been certified by the payment service provider, etc. Any of these determinations may result in an assignment or adjustment of a risk score that may be compared to a risk threshold that determines whether the risk information satisfies the risk criteria included in the risk determination about the payer in the crypto currency transaction. Furthermore, as discussed herein, the risk threshold may determine how many confirmations a block including the crypto currency transaction will be required before it is accepted by the payee. While a few specific examples have been provided, one of skill in the art in possession of the present disclosure will appreciate that any type of risk information about a payer may be retrieved compared to any type of risk criteria to determine whether it satisfies that risk criteria while remaining within the scope of the present disclosure.

If, at decision block 114, the computing device determines that the risk information satisfies the risk criteria in the request for the risk determination, the method 100 proceeds to block 108 where the computing device provides the crypto currency transaction for addition to a block in a crypto currency public ledger substantially as described above. As discussed below, the provisioning of the crypto currency transaction for addition to a block in the crypto currency public ledger may be performed in a variety of manners that will fall within the scope of the present disclosure.

For example, in situations where the memory pool subsystem 500 of FIG. 5 is used in the risk determination enabled crypto currency transaction system 400, the determination that the risk information satisfies the risk criteria in the request for the risk determination may result in the system provider device then moving that crypto currency transaction to the transaction memory pool 506. Once stored in the transaction memory pool 506, any of the system provider devices 412 may group the crypto currency transaction (for which the risk determination process has determined that risk criteria has been satisfied) with other crypto currency transactions, and then increment a proof-of work system (e.g., determining a value that when hashed with those crypto currency transactions provides a required number of zero bits,) to create the block that is then added to the crypto currency public ledger. As such, when the memory pool subsystem 500 is implemented as part of the risk determination enabled crypto currency transaction system 400, crypto currency transactions that include requests for risk determinations may undergo a multi-memory pool process in which risk determinations for those crypto currency transaction are conducted from crypto currency transactions in a risk memory pool and, if the payer and/or payee in those crypto currency transactions satisfy risk criteria, those crypto currency transaction are then moved to a transaction memory pool where they may then be added to a block in the crypto currency public ledger.

In such embodiments, a risk determination fee system may be implemented where system provider devices 412 are incentivized to perform risk determinations. For example, crypto currency transactions including requests to perform risk determinations may be broadcast by payer devices and added to the risk memory pool 506, where first system provider devices may perform risk determinations for payers and/or payees in those crypto currency transactions and receive a fee for doing so. If the payers and/or payees in those crypto currency transactions satisfy the risk criteria, those crypto currency transactions may be rebroadcast to second system provider devices who will add those crypto currency transactions to the transaction memory pool, and group those crypto currency transactions in an attempt to add them to a block in the crypto currency public ledger, and also receive a fee for doing so. Similarly, a determination that the payers and/or payees in those crypto currency transactions do not satisfy the risk criteria, those crypto currency transactions will not be rebroadcast to second system provider devices such that they are not added the transaction memory pool and will not be included in any blocks on the crypto currency public ledger. One of skill in the art in possession of the present disclosure will recognize that, in such a system, the first system provider devices and the second system provider devices discussed above may perform both risk determination and block creation in order to collect fees for each.

In another example, in situations where the risk determination enabled crypto currency transaction system 400 groups conventional crypto currency transaction and crypto currency transactions with requests for risk determinations in a common memory pool, the determination that the risk information satisfies the risk criteria in the request for the risk determination may result in the system provider device then grouping the crypto currency transaction (for which the risk determination process has determined that risk criteria has been satisfied) with other crypto currency transactions, and then incrementing a proof-of work system (e.g., determining a value that when hashed with those crypto currency transactions provides a required number of zero bits,) to create the block that is then added to the crypto currency public ledger. As such, system provider devices may perform risk determinations for crypto currency transaction (for a fee in some embodiments) and, if the payer and/or payee in those crypto currency transactions satisfy risk criteria, then attempt to create a block for addition to the crypto currency public ledger.

In some embodiments, the addition of the crypto currency transaction to a block in the public ledger at block 108 following a determination at decision block 114 that its risk information satisfies the risk criteria in its request may provide for a higher trust level associated with the crypto currency transaction. For example, upon having the determination that made that the risk information satisfies the risk criteria in the request in the crypto currency transaction, the crypto currency transaction may be marked as a "trusted" or "risk certified" transaction. As would be understood by one of skill in the art in possession of the present disclosure, upon being initially added to a block in the crypto currency public ledger by a first computing device in the distributed network, other second computing devices in the distributed network may confirm that block, and payees typically require a minimum number of a confirmation of a block (e.g., 6 to 10, and in some cases more depending on the transaction) before its transactions are accepted as permanent. However, payees may required fewer confirmations to accept as permanent a crypto currency transaction in a block if that crypto currency transaction is "trusted" or "risk certified" as discussed above. Furthermore, payees may required more confirmations to accept as permanent a crypto currency transaction in a block if that crypto currency transaction is not "trusted" or "risk certified" as discussed above.

If, at decision block 114, the computing device determines that the risk information does not satisfy the risk criteria in the request for the risk determination, the method 100 proceeds to block 116 where the computing device prevents the crypto currency transaction from being added to a block in the crypto currency public ledger. In an embodiment, at block 116. As discussed below, the prevention of the crypto currency transaction from being added to a block in the crypto currency public ledger may be performed in a variety of manners that will fall within the scope of the present disclosure.

For example, in situations where the memory pool subsystem 500 of FIG. 5 is used in the risk determination enabled crypto currency transaction system 400, the determination that the risk information does not satisfy the risk criteria in the request for the risk determination may result in the system provider device then rejecting that crypto currency transaction such that it is not added the transaction memory pool 506. By preventing the crypto currency transaction from being added to the transaction memory pool 506, system provider devices 412 will not be able to group the crypto currency transaction (for which the risk determination process has determined that risk criteria has not been satisfied) with other crypto currency transactions as part of any block that will be added to the crypto currency public ledger. As such, when the memory pool subsystem 500 is implemented as part of the risk determination enabled crypto currency transaction system 400, crypto currency transactions that include requests for risk determinations that are not satisfied will undergo a first portion of a multi-memory pool process in which risk determinations for those crypto currency transaction are conducted from crypto currency transactions in a risk memory pool and, if the payer and/or payee in those crypto currency transactions does not satisfy risk criteria, those crypto currency transaction are prevented from entering a transaction memory pool such that they may not be added to a block in the crypto currency public ledger.

In another example, in situations where the risk determination enabled crypto currency transaction system 400 groups conventional crypto currency transaction and crypto currency transactions with requests for risk determinations in a common memory pool, the determination that the risk information does not satisfy the risk criteria in the request for the risk determination may result in the system provider device then dropping the crypto currency transaction (for which the risk determination process has determined that risk criteria has been satisfied) such that it is not part of any block that the system provider device then attempt to add to the crypto currency public ledger. As such, system provider devices may perform risk determinations for crypto currency transaction and, if the payer and/or payee in those crypto currency transactions do not satisfy risk criteria, that crypto currency transaction is not grouped with any other crypto currency transaction for attempted addition to block in the crypto currency transaction, and is thus prevented from being added to a block for addition to the crypto currency public ledger.

Thus, systems and methods for enabling risk determinations in a crypto currency transaction have been described that allow payers and/or payees participating in crypto currency transactions to request a determination of the risk involved with either or both parties in the crypto currency transaction and, if risk criteria is not satisfied by either or both of those parties, prevent that transaction from completing. A payer creating the crypto currency transaction may create a crypto currency transaction that includes a request for a risk determination that designates risk criteria for a payer and/or the payee involved in that crypto currency transaction. The payer may then broadcast the crypto currency transaction via a network, and computing device(s) may receive that crypto currency transaction, identify the request to make the risk determination, and add it to a risk determination memory pool. A computing device may then retrieve the transaction from the risk determination memory pool, identify the payee and/or payer involved in the crypto currency transaction, and access an external risk information database in order to identify risk information about the payer and/or payee. A determination is then made of whether the risk information satisfies the risk criteria in the request, and if the risk information satisfies the risk criteria the crypto currency transaction is provided to a transaction memory pool so that it may be added to a block in a crypto currency public ledger, while if the risk information does not satisfy the risk criteria in the request the crypto currency transaction is not provided to the transaction memory pool such that it is prevented from being added to a block in a crypto currency public ledger.

Figure 6:
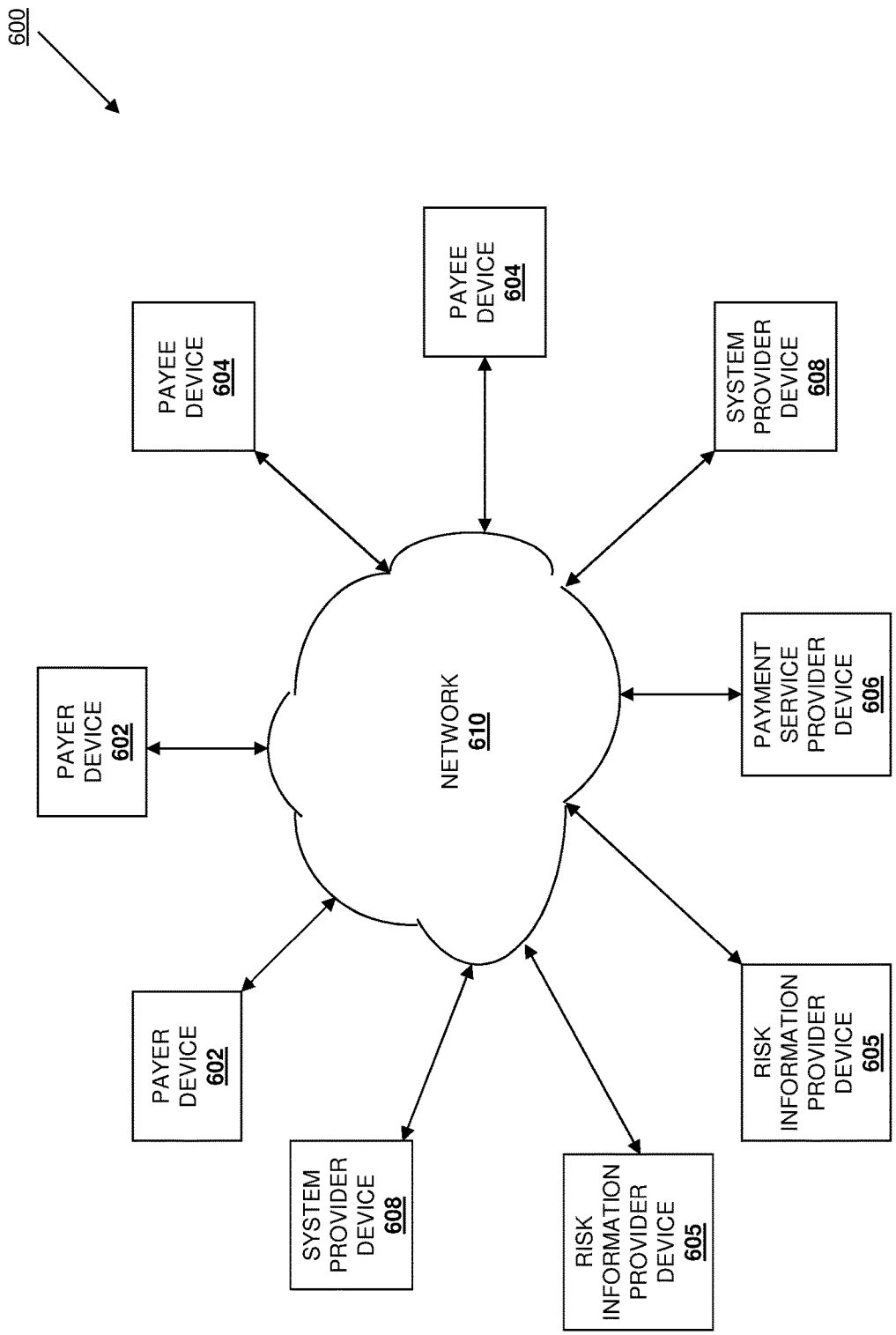
FIG. 6 is a schematic view illustrating an embodiment of a networked system.

Referring now to FIG. 6, an embodiment of a network-based system 600 for implementing one or more processes described herein is illustrated. As shown, network-based system 600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 600 illustrated in FIG. 6 includes a plurality of payer devices 602, a plurality of payee devices 604, a plurality of risk information provider devices 605, a payment service provider device 606, and a system provider device 608 in communication over a network 610. Any of the payer devices 602 may be the payer devices operated by the payers discussed above. The payee devices 604 may be the payee devices operated by the payees discussed above. The risk information provider devices 605 may be the risk information provider devices operated by the risk information providers discussed above. The payment service provider device 606 may be the payment service provider devices discussed above and may be operated by a payment service provider such as, for example, PayPal Inc. of San Jose, Calif. The system provider device 608 may provide, for example, the distributed network of computing devices discussed above.

The payer devices 602, payee devices 604, risk information provider devices 605, payment service provider device 606, and system provider devices 608 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The payer devices 602 may be implemented using any appropriate combination of hardware and/or software configured for wired and/or wireless communication over network 610. For example, in one embodiment, the payer devices 602 may be implemented as a personal computer of a user in communication with the Internet. In other embodiments, the payer devices 602 may be a smart phone, personal digital assistant (PDA), laptop computer, and/or other types of computing devices.

The payer devices 602 may include one or more browser applications which may be used, for example, to provide a convenient interface to permit the payer to browse information available over the network 610. For example, in one embodiment, the browser application may be implemented as a web browser configured to view information available over the Internet.

The payer devices 602 may also include one or more toolbar applications which may be used, for example, to provide user-side processing for performing desired tasks in response to operations selected by the payer. In one embodiment, the toolbar application may display a user interface in connection with the browser application.

The payer devices 602 may further include other applications as may be desired in particular embodiments to provide desired features to the payer devices 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the payer to send and receive emails and/or text messages through the network 610. The payer devices 602 include one or more user and/or device identifiers which may be implemented, for example, as operating system registry entries, cookies associated with the browser application, identifiers associated with hardware of the payer devices 602, or other appropriate identifiers, such as a phone number. In one embodiment, the user identifier may be used by the risk information provider device 605 and/or the payment service provider device 606 to associate the payer with a particular account as further described herein.

The payee devices 604 may be maintained, for example, by conventional or on-line merchants, conventional or digital goods sellers, individual sellers, and/or application developers offering various products and/or services in exchange for payment to be received conventionally or over the network 610. In this regard, the payee devices 604 may include a database identifying available products and/or services (e.g., collectively referred to as items) which may be made available for viewing and purchase by the payer.

The payee devices 604 also include checkout application which may be configured to facilitate the purchase by the payer of items. The checkout application may be configured to accept payment information from the user through the payer devices 602, the system provider through the system provider device 608, and/or from the payment service provider through the payment service provider device 606 over the network 610.

Figure 7:
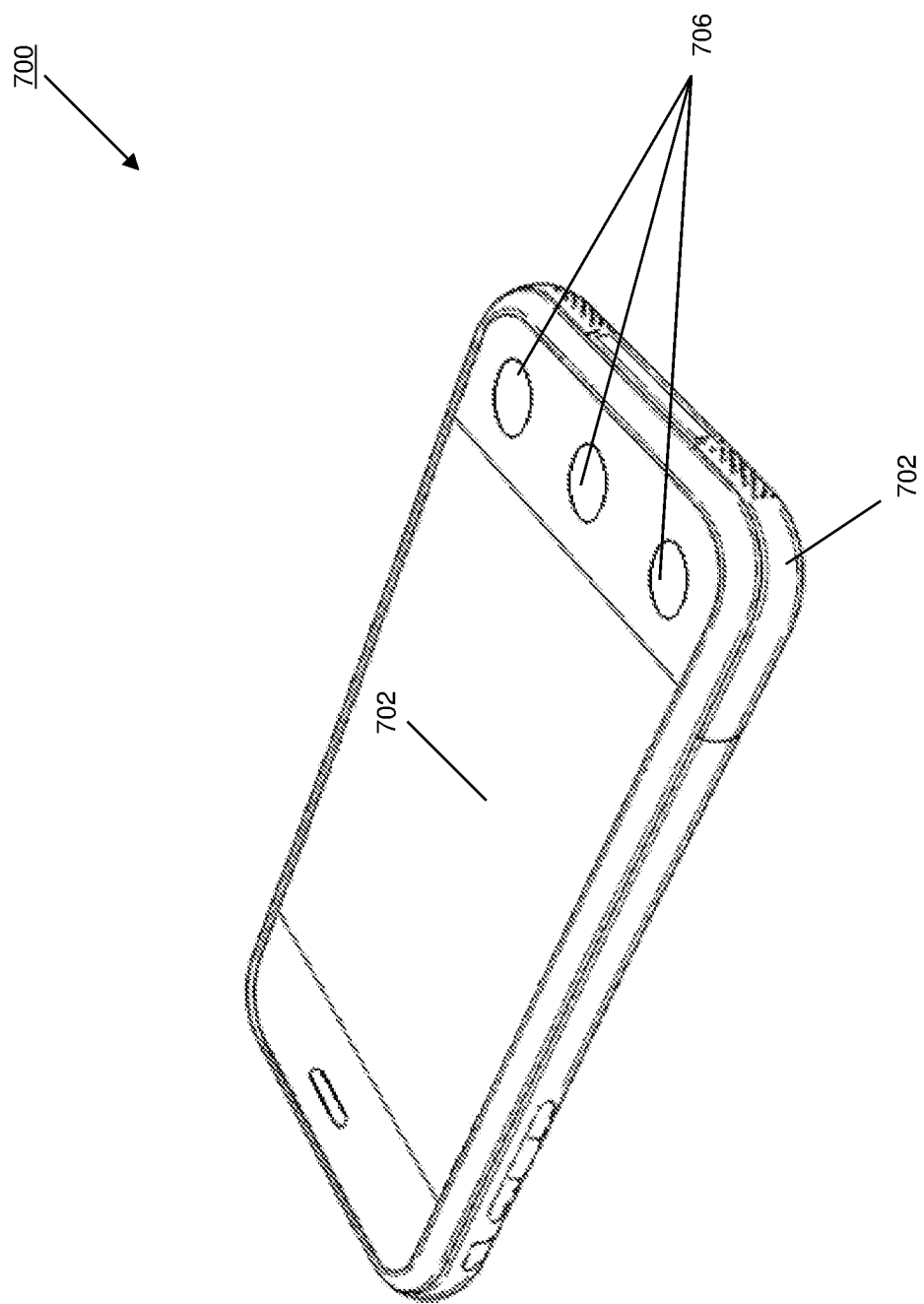
FIG. 7 is a perspective view illustrating an embodiment of a payer device.

Referring now to FIG. 7, an embodiment of a payer device 700 is illustrated. The payer device 700 may be the payer devices discussed above, and may include a chassis 702 having a display 704 and an input device including the display 704 and a plurality of input buttons 706. One of skill in the art will recognize that the payer device 700 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 8:
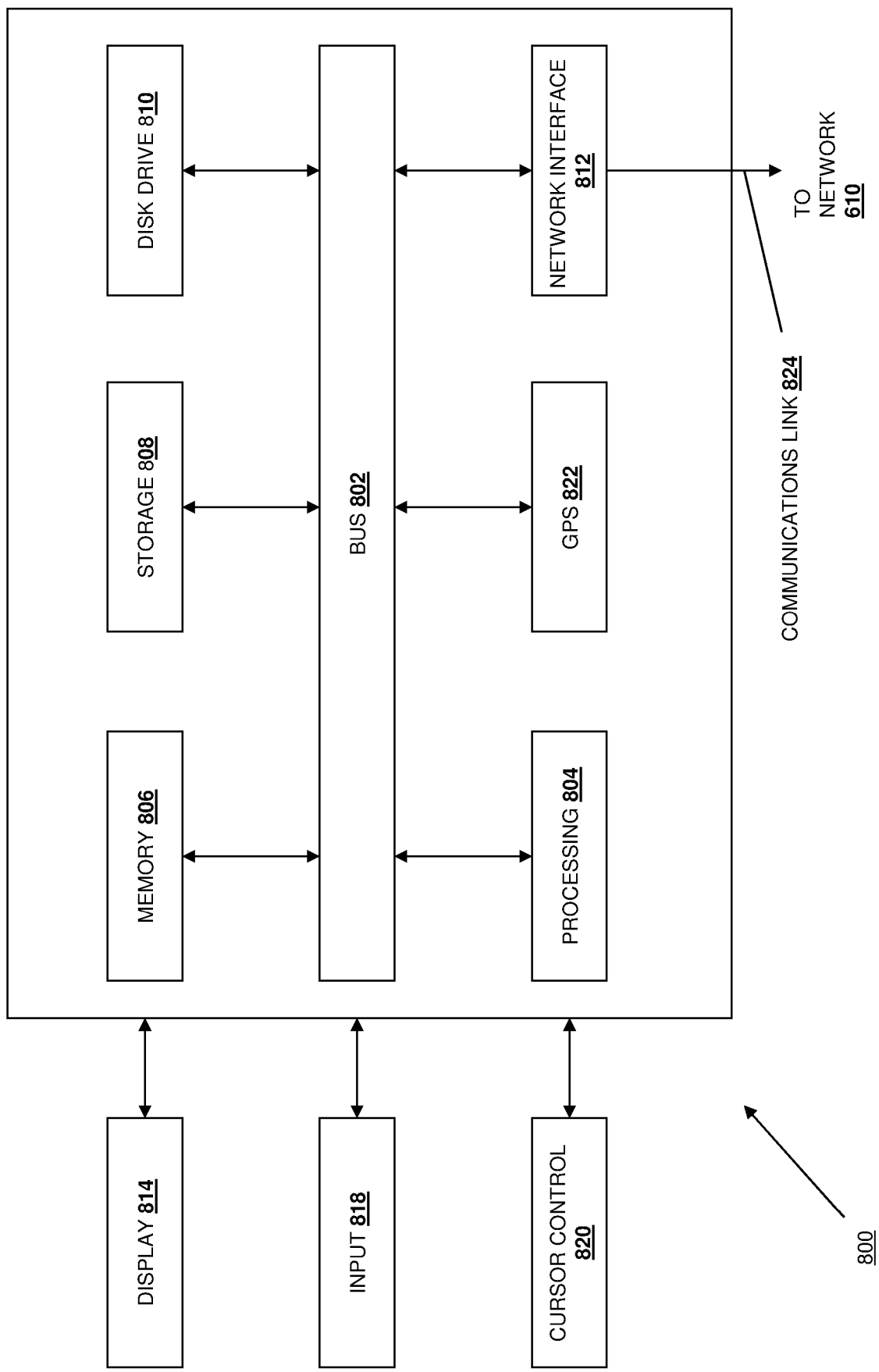
FIG. 8 is a schematic view illustrating an embodiment of a computer system.

Referring now to FIG. 8, an embodiment of a computer system 800 suitable for implementing, for example, the payer devices, the payee devices, the risk information provider devices, the payment service provider device, and/or the system provider device discussed above, is illustrated. It should be appreciated that other devices utilized by payer, payees, users, payment service providers, and system providers in the payment system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the payer devices, the payee devices, the user devices, the payment service provider device, and/or the system provider devices discussed above. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
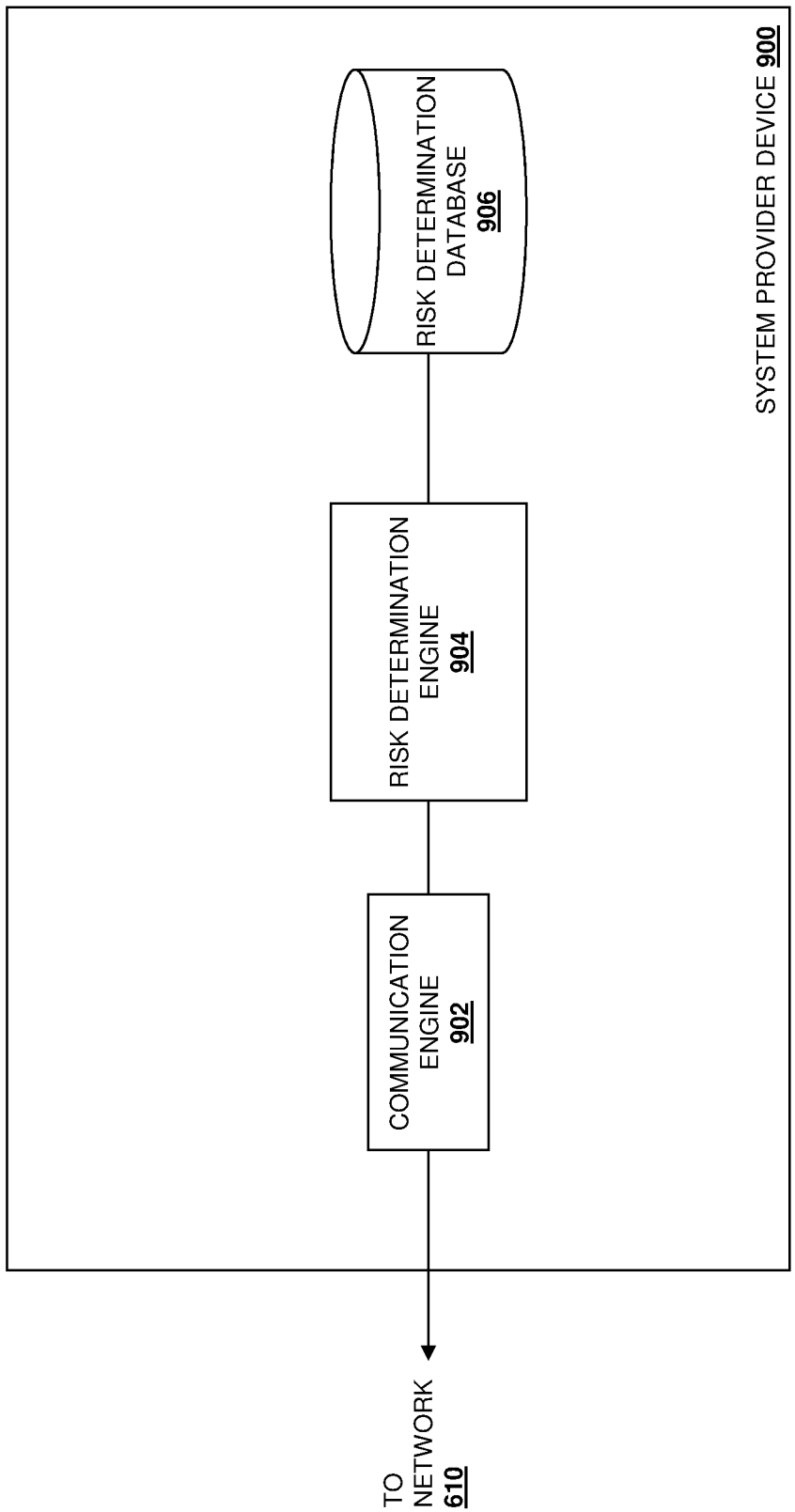
FIG. 9 is a schematic view illustrating an embodiment of a system provider device.

Referring now to FIG. 9, an embodiment of a system provider device 900 is illustrated. The device 900 includes a communication engine 902 that is coupled to the network 610 and to a risk determination engine 904 that is coupled to a risk determination database 906. The communication engine 902 may be software or instructions stored on a computer-readable medium that allows the device 900 to send and receive information over the network 610. The risk determination engine 904 may be software or instructions stored on a computer-readable medium that, when executed by one or more hardware processors, cause the device to perform any of the functionality that is discussed above. While the database 906 has been illustrated as located in the device 900, one of skill in the art will recognize that it may be connected to the risk determination engine 904 through the network 610 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A risk determination enabled crypto currency transaction system, comprising:
   one or more hardware processors;
   a risk determination memory pool, a transaction memory pool and memory storing instructions that when executed by the one or more hardware processors, causes the one or more hardware processors to perform operations comprising:
   receiving, through a network via a first broadcast by a first payer device, a first crypto currency transaction that comprises:
   a first payee public address; a first request for a determination of risk for the first cryptocurrency transaction; and
   at least one first risk criteria;
   identifying, in the first crypto currency transaction, the first request for a determination of risk;
   storing, in response to identifying the first request for the determination of risk, the first crypto currency transaction in a-the risk determination memory pool;
   receiving, through the network via a second broadcast by a second payer device, a second crypto currency transaction that comprises:
   a second payee public address;
   storing the second crypto currency transaction in the transaction memory pool;
   retrieving, subsequent to storing the first crypto currency transaction in the risk determination memory pool, the first crypto currency transaction from the risk determination memory pool;
   identifying, using the first payee public address, a first payee involved in the first crypto currency transaction;
   accessing, through the network via at least one network-connected risk information database and based on the identification of the first payee, first payee risk information;
   determining that the first payee risk information satisfies the at least one first risk criteria;
   storing, in response to determining that the first payee risk information satisfies the at least one first risk criteria in the first request, the first crypto currency transaction in a-the transaction memory pool;
   retrieving, subsequent to storing the first crypto currency transaction and the second crypto currency transaction in the transaction memory pool, the first crypto currency transaction and the second crypto currency transaction from the transaction memory pool;
generating a block using the first crypto currency transaction and the second crypto currency transaction;
writing the block to the crvoto currency public ledger; and
broadcasting the block to the network.

2. The system of claim 1, wherein the operations further comprise:
receiving, through the network via a third broadcast by a third payer device, a third crypto currency transaction that comprises:
a third payee public address;
a second request for a determination of risk for the third cryptocurrency transaction; and
at least one second risk criteria;
identifying, in the third crypto currency transaction, the second request for a determination of risk associated with the third crypto currency transaction;
storing, in response to identifying the second request for the determination of risk, the third crypto currency transaction in the risk determination memory pool;
retrieving, subsequent to storing the third crypto currency transaction in the risk determination memory pool, the third crypto currency transaction from the risk determination memory pool;
identifying, using the third payee public address, a third payee involved in the third crypto currency transaction;
accessing, through the network via the at least one network-connected risk information database and based on the identification of the third payee, third payee risk information;
determining that the third payee risk information does not satisfy the at least one second risk criteria;
storing, in response to determining that the third payee risk information satisfies the at least one second risk criteria in the second request, the third crypto currency transaction in a-the transaction memory pool; and
retrieving, subsequent to storing the third crypto currency transaction in the transaction memory pool, the third crypto currency transaction from the transaction memory pool.

3. The system of claim 1, wherein the first crypto currency transaction comprises a first payer public address from which to send a transaction amount, and wherein the operations further comprise:
identifying, using the first payer public address, a first payer involved in the first crypto currency transaction;
accessing, through the network via the at least one network-connected risk information database and based on the identification of the first payer, first payer risk information;
determining that the first payer risk information satisfies the at least one first risk criteria in the first request; and
providing, in response to determining that each of the first payee risk information and the first payer risk information satisfy the at least one first risk criteria in the first request, the first crypto currency transaction in the transaction memory pool.

4. The system of claim 1, wherein the operations further comprise:
receiving, in response to determining that the first payee risk information satisfies the at least one first risk criteria, a fee.

5. The system of claim 1, wherein the operations further comprise:
receiving, in response to generating the block using the first crypto currency transaction and the second crypto currency transaction, a fee.

6. The system of claim 1, wherein the operations further comprise:
accessing at least one registered public address database; and
identifying the first payee involved in the first cryptocurrency transaction by identifying the first payee that was previously associated with the first payee public address in the at least one registered public address database.

7. A method for providing a risk determination in a crypto currency transaction, comprising:
receiving, by a computing device through a network via a first broadcast by a first payer device, a first crypto currency transaction that comprises:
a first payee public address;
a first request for a determination of risk for the first cryptocurrency transaction; and at least one first risk criteria;
identifying, by the computing device in the first crypto currency transaction, the first request for a determination of risk;
storing, by the computing device in response to identifying the first request for the determination of risk, the first crypto currency transaction in a risk determination memory pool included in the computing device;
receiving, by the computing device through the network via a second broadcast by a second payer device, a second crypto currency transaction that comprises:
a second payee public address;
storing, by the computing device, the second crypto currency transaction in a transaction memory pool included in the computing device;
retrieving, by the computing device subsequent to storing the first crypto currency transaction in the risk determination memory pool, the first crypto currency transaction from the risk determination memory pool;
identifying, by the computing device using the first payee public address, a first payee involved in the first crypto currency transaction;
accessing, by the computing device through the network via at least one network-connected risk information database and based on the identification of the first payee, first payee risk information;
determining, by the computing device, that the first payee risk information satisfies at least one first risk criteria;
storing, by the computing device in response to determining that the first payee risk information satisfies the at least one first risk criteria in the first request, the first crypto currency transaction in a-the transaction memory pool;
retrieving, by the computing device subsequent to storing the first crypto currency transaction and the second crypto currency transaction in the transaction memory pool, the first crypto currency transaction and the second crypto currency transaction from the transaction memory pool;
generating, by the computing device, a block using the first crypto currency transaction and the second crypto currency transaction,
writing, by the computing device, the block to the crypto currency public ledger; and
broadcasting, by the computing device, the block to the network.

8. The method of claim 7, further comprising:
receiving, by the computing device through the network via a third broadcast by a third payer device, a third crypto currency transaction that comprises:
a third payee public address;
a second request for a determination of risk for the third cryptocurrency transaction; and
at least one second risk criteria;
identifying, by the computing device in the third crypto currency transaction, the second request for a determination of risk associated with the third crypto currency transaction;
storing, by the computing device in response to identifying the second request for the determination of risk, the third crypto currency transaction in the risk determination memory pool;
retrieving, by the computing device subsequent to storing the third crypto currency transaction in the risk determination memory pool, the third crypto currency transaction from the risk determination memory pool;
identifying, by the computing device using the third payee public address, a third payee involved in the third crypto currency transaction;
accessing, by the computing device through the network via the at least one network-connected risk information database and based on the identification of the third payee, third payee risk information;
determining, by the computing device, that the third payee risk information does not satisfy the at least one second risk criteria;
storing, by the computing device in response to determining that the third payee risk information satisfies the at least one second risk criteria in the second request, the third crypto currency transaction in a-the transaction memory pool; and
retrieving, by the computing device subsequent to storing the third crypto currency transaction in the transaction memory pool, the third crypto currency transaction from the transaction memory pool.

9. The method of claim 7, wherein the first crypto currency transaction comprises a first payer public address from which to send a transaction amount, and wherein the method further comprises:
identifying, by the computing device using the first payer public address, a first payer involved in the first crypto currency transaction;
accessing, by the computing device through the network via the at least one network-connected risk information database and based on the identification of the first payer, first payer risk information;
determining, by the computing device, that the first payer risk information satisfies the at least one first risk criteria in the first request; and
providing, by the computing device in response to determining that each of the first payee risk information and the first payer risk information satisfy the at least one first risk criteria in the first request, the first crypto currency transaction in the transaction memory pool.

10. The method of claim 7, further comprising:
receiving, by the computing device in response to determining that the first payee risk information satisfies the at least one first risk criteria, a fee.

11. The method of claim 7, further comprising:
receiving, by the computing device in response to generating the block using the first crypto currency transaction and the second crypto currency transaction, a fee.

12. The method of claim 7, wherein the method further includes:
accessing, by the computing device, at least one registered public address database; and
identifying, by the computing device, the first payee involved in the first crvoto currency transaction by identifying the first payee that was previously associated with the first payee public address in the at least one registered public address database.

13. The method of claim 7, wherein the method further includes:
adding, by the computing device, the first crypto currency transaction to the block.

14. A non-transitory machine-readable medium having stored thereon machine-readable instructions that when executed by a machine cause the machine to perform operations comprising:
receiving, through a network via a first broadcast by a first payer device, a first crypto currency transaction that comprises:
a first payee public address;
a first request for a determination of risk for the first cryptocurrency transaction; and
at least one first risk criteria;
identifying, in the first crypto currency transaction, the first request for a determination of risk;
storing, in response to identifying the first request for the determination of risk, the first crypto currency transaction in a risk determination memory pool included in a non-transitory memory system;
receiving, through the network via a second broadcast by a second paver device, a second crypto currency transaction that comprises: a second payee public address;
storing the second crypto currency transaction in the transaction memory pool;
retrieving, subsequent to storing the first crypto currency transaction in the risk determination memory pool, the first crypto currency transaction from the risk determination memory pool;
identifying, using the first payee public address, a first payee involved in the first crypto currency transaction;
accessing, through the network via at least one network-connected risk information database and based on the identification of the first payee, first payee risk information;
determining that the first payee risk information satisfies the at least one first risk criteria;
storing, in response to determining that the first payee risk information satisfies the at least one first risk criteria in the first request, the first crypto currency transaction in a transaction memory pool that is included in the non-transitory memory system;
retrieving, subsequent to storing the first crypto currency transaction and the second crypto currency transaction in the transaction memory pool, the first crypto currency transaction and the second crypto currency transaction from the transaction memory pool;
generating a block using the first crypto currency transaction and the second crypto currency transaction;
writing the block to the crypto currency public ledger; and
broadcasting the block to the network.

15. The non-transitory machine-readable medium of claim 14, wherein the operations further comprise:
receiving, through the network via a third broadcast by a third payer device, a third crypto currency transaction that comprises:

a third payee public address;

a second request for a determination of risk for the third cryptocurrency transaction;

and at least one second risk criteria;

identifying, in the third crypto currency transaction, the second request for a determination of risk associated with the third crypto currency transaction;

storing, in response to identifying the second request for the determination of risk, the third crypto currency transaction in the risk determination memory pool;

retrieving, subsequent to storing the third crypto currency transaction in the risk determination memory pool, the crypto currency transaction from the risk determination memory pool;

identifying, using the third payee public address, a third payee involved in the third crypto currency transaction;

accessing, through the network via the at least one network-connected risk information database and based on the identification of the third payee, third payee risk information;

determining that the third payee risk information does not satisfy the at least one second risk criteria;

storing, in response to determining that the third payee risk information satisfies the at least one second risk criteria in the second request, the third crypto currency transaction in a-the transaction memory pool; and retrieving, subsequent to storing the third crypto currency transaction in the transaction memory pool, the third crypto currency transaction from the transaction memory pool.

16. The non-transitory machine-readable medium of claim 15, wherein the first crypto currency transaction comprises a first payer public address from which to send a transaction amount, and wherein the operations further comprise:

identifying, using the first payer public address, a first payer involved in the first crypto currency transaction;

accessing, through the network via the at least one network-connected risk information database and based on the identification of the first payer, first payer risk information;

determining that the first payer risk information satisfies the at least one first risk criteria in the first request; and providing, in response to determining that each of the first payee risk information and the first payer risk information satisfy the at least one first risk criteria in the first request, the first crypto currency transaction in the transaction memory pool.

17. The non-transitory machine-readable medium of claim 14, wherein the operations further comprise:

receiving, in response to determining that the first payee risk information satisfies the at least one first risk criteria, a fee.

18. The non-transitory machine-readable medium of claim 14, wherein the operations further comprise:

receiving, in response to generating the block using the first crypto currency transaction and the second crypto currency transaction, a fee.

19. The non-transitory machine-readable medium of claim 14, wherein the operations further includes:

accessing at least one registered public address database; and identifying the first payee involved in the first cryptocurrency transaction by identifying the payee that was previously associated with the first payee public address in the at least one registered public address database.

20. The non-transitory machine-readable medium of claim 19, wherein the operations further comprise:

adding the first crypto currency transaction and the second cryptocurrency transaction to the block.

* * * * *